United States Patent
Chen

(10) Patent No.: US 7,580,371 B2
(45) Date of Patent: Aug. 25, 2009

(54) METHOD FOR RECOGNIZING LOCAL MANAGEMENT INTERFACE TYPE AUTOMATICALLY BY DATA TERMINAL EQUIPMENT

(75) Inventor: Zhimin Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 580 days.

(21) Appl. No.: 10/502,906

(22) PCT Filed: May 30, 2002

(86) PCT No.: PCT/CN02/00369

§ 371 (c)(1),
(2), (4) Date: Feb. 8, 2005

(87) PCT Pub. No.: WO03/065675

PCT Pub. Date: Aug. 7, 2003

(65) Prior Publication Data

US 2005/0120028 A1    Jun. 2, 2005

(30) Foreign Application Priority Data

Jan. 30, 2002    (CN) .............................. 02 1 00444

(51) Int. Cl.
    *H04L 12/00*    (2006.01)
(52) U.S. Cl. ...................................... 370/255
(58) Field of Classification Search ................. 370/401, 370/395, 397, 255, 254, 465; 709/224
    See application file for complete search history.

(56) References Cited

U.S. PATENT DOCUMENTS

| 5,802,042 A | 9/1998 | Natarajan et al. |
| 6,292,495 B1 | 9/2001 | Von Hammerstein et al. |
| 6,434,120 B1 * | 8/2002 | Natarajan et al. ........... 370/255 |
| 6,446,122 B1 * | 9/2002 | Rawat et al. ................. 709/224 |
| 6,493,352 B1 * | 12/2002 | Mawhinney et al. ........ 370/458 |
| 2007/0019676 A1 * | 1/2007 | Kompella ................... 370/468 |

* cited by examiner

*Primary Examiner*—Kwang B Yao
*Assistant Examiner*—Syed Bokhari

(57) ABSTRACT

A method for recognizing LMI type automatically by a DTE includes: while communicating with a DCE for a first time or when a LMI protocol type at the DCE is changed during a communication process, the DTE generating different status enquiry messages with the frame formats of all LMI protocol types supported by the DTE, and sending the different status enquiry messages to the DCE simultaneously; after receiving the first status response message from the DCE, the DTE recognizing and recording LMI protocol type of the current response message, and then communicating with the DCE through the messages generated with the frame format of the LMI protocol type. With this method, the DTE can automatically recognize and match the LMI protocol type currently used at DCE. Therefore, normal communication between DTE and DCE is ensured, system reliability and stability is improved, meanwhile operation and management of the system is facilitated.

4 Claims, 2 Drawing Sheets

METHOD FOR RECOGNIZING LOCAL MANAGEMENT INTERFACE TYPE AUTOMATICALLY BY DATA TERMINAL EQUIPMENT

CROSS-REFERENCE TO RELATED APPLICATIONS

This application is a National Stage of International Application No. PCT/CN02/00369, filed May 30, 2002 and published in Chinese on Aug. 7, 2003 as WO 03/065675 A1. This application claims the benefit of Chinese Application No. 02100444.7, filed Jan. 30, 2002. The disclosure(s) of the above applications are incorporated herein by reference.

FIELD OF THE TECHNOLOGY

The present invention relates to recognition technology for Local Management Interface (LMI) in network, and more particularly to a method for recognizing LMI type automatically by a Data Terminal Equipment (DTE).

BACKGROUND OF THE INVENTION

At present, LMI type is a very important configuration between a DTE and a Data Circuit Equipment (DCE) whose communication is implemented with Frame Relay (FR) technique. The so-called LMI is a protocol used for monitoring Permanent Virtual Circuit (PVC) status. In PVC environment, it is necessary for both the network equipment and the subscriber equipment to know current PVC status, i.e. whether the PVC is usable. Moreover, the same kind of LMI protocol must be configured at both of DTE and DCE in practice to guarantee normal communication. There are three kinds of LMI protocols used in prior frame relay links: Q.933 Appendix A of International Telecommunications Union-Telecommunications Standardization section (ITU-T), T1.617 Appendix D of American National Standards Institute (ANSI) and CISCO LMI standard.

In User-Network Interface (UNI) of frame relay, PVC status at the DTE is exclusively determined by the DCE which is responsible for informing DTE with all PVC status in UNI. PVC status in the DCE is determined by network devices. Procedure of obtaining current PVC status at DTE will be described as follows. The DTE sends a STATUS ENQUIRY message which is usually used for verifying link integrity to the DCE at interval of T391, after N391 STATUS ENQUIRY messages have been transmitted, a STATUS ENQUIRY message for enquiring full status will be sent. After receiving a STATUS ENQUIRY message, the DCE will respond with a STATUS message to report current information about PVC. Through polling mechanism of question-answer process between DTE and DCE, the DTE can obtain current status of all PVCs in time. Here, T391 and N391 are two variables defined in ITU-T Q.933 Appendix A. T391 refers to time intervals for enquiring status and sending link integrity message to DCE by DTE, the scope of T391 is 5~30 seconds and the default value of that is 10 seconds. N391 represents the cycle for enquiring status and sending link integrity message to DCE by DTE, the scope of N391 is 1~255 and the default value of that is 6, which means every 6 times sending operations for link integrity message will be accompanied with one sending operation for STATUS ENQUIRY message for enquiring full status.

In Network-Network Interface (NNI) of the frame relay, PVC status is exchanged regularly with LMI protocol between both sides of the network devices. Unlike the process in UNI, each side of the network devices sends enquiry messages to the opposite side, and responds after receiving the enquiry messages from the opposite side.

Protocol rules of the LMI mainly include four parts: adding notification of PVC; deleting detection of PVC; notification on usable (activated) or unusable (inactivated) status of the configured PVC; and link integrity verification.

As for the three kinds of available LMI protocols, they have the almost same rules, with slightly difference in frame format. In Q.933 Appendix A, STATUS or STATUS ENQUIRY messages are transmitted through the virtual circuit with DLCI=0. STATUS ENQUIRY message is used for enquiring status and link integrity of the PVC, while STATUS message is used for answer STATUS ENQUIRY message to inform PVC status or link integrity verification. As shown in Table 1 and Table 2, the STATUS message and STATUS ENQUIRY message comprise the following elements respectively, wherein, length is measured in byte, and values of the elements are determined by the protocol according to different message types.

TABLE 1

Format of the STATUS message

| Name of the elements | Length (Byte) |
| --- | --- |
| Protocol discriminator | 1 |
| Call reference | 1 |
| Message type | 1 |
| Report type | 3 |
| Link integrity verification | 4 |
| PVC status | 5-7 |

TABLE 2

Format of the STATUS ENQUIRY message

| Name of the elements | Length (Byte) |
| --- | --- |
| Protocol discriminator | 1 |
| Call reference | 1 |
| Message type | 1 |
| Report type | 3 |
| Link integrity verification | 4 |

Just like ITU-T Q.933, the STATUS ENQUIRY and response messages are also transmitted through the virtual circuit with DLCI=0 in ANSI T1.617 Appendix D. The difference between ITU-T Q.933 and ANSI T1.617 Appendix D lies in that an information element is added in LMI message of the ANSI and values of the elements in the messages are constant. In CISCO LMI standard, the STATUS ENQUIRY and response messages are transmitted through the virtual circuit with DLCI=1023, and values of the elements in the messages are constant, but format of PVC status is different from that of Q.933 and ANSI.

The operation process of the LMI protocol will be briefly described as follows:

1) The DTE sends a status enquiry message STATUS ENQUIRY first, and timer T391 begins to time. The interval of T391 is a time interval of each polling process, which means DTE sends a STATUS ENQUIRY in every two T391s. At the same time, the counter V391 of DTE begins to count. When V391<N391, the DTE sends a STATUS ENQUIRY for enquiring link integrity; else when V391=N391, V391 is reset to zero, and the DTE sends a STATUS ENQUIRY enquiring not only link integrity but also all PVC status which is called STATUS ENQUIRY for enquiring full status. N391 defines length of a cycle, and in every two cycles, the DTE sends a STATUS ENQUIRY for enquiring full status. Values of the T391 and N391 can be set manually, or be chosen with default values.

2) After receiving an enquiry message, the DCE answers status enquiry message STATUS ENQUIRY with status message STATUS, and polling confirm timer T392 of the DCE begins to time, the DCE waits for a next status enquiry message STATUS ENQUIRY. If T392 overtimes and no status enquiry message STATUS ENQUIRY has been received, the DCE will record the error, and the number of error times will be added by 1.

3) The DTE reads the received response message STATUS to find out link status and PVC status. The DCE responds for the status that DTE wants to know. If some changes on PVC status happens in the network or there is an added/deleted PVC, no matter the other side enquires PVC status or not, the DCE will reply DTE with status messages of all PVCs, in order to ensure the DTE to know changes of the DCE and update the former records. If timer T391 overtimes and no status message STATUS has been received, the DTE will record the error, and the number of error times will be added by 1.

4) If the number of error times exceeds N392 in N393 events, the DTE or DCE will consider the physical route and all virtual circuits being unusable. Here, N392 and N393 are two variables defined in ITU-T Q933 Appendix A. N392 is an error threshold, the scope of N392 is 1~10 and the default value is 3; N393 refers to total number of investigated events, the scope of N393 is 1~10 and the default value is 4. The values of N392 and N393 can be manually set or be chosen with default values.

In the above-mentioned process, while the DTE and the DCE communicate with each other, only when LMI protocol type set at DTE is the same with that set at DCE, the DCE can recognize status enquiry message STATUS ENQUIRY sent from the DTE, and notify the DTE PVC status through STATUS message. If LMI protocol type set at DTE is different from that set at DCE, the DCE can not recognize status enquiry message STATUS ENQUIRY sent from the DTE, and can not respond with a response message, disabling normal communication between both sides.

It can be seen LMI type configuration plays an important role in the whole communication process between DTE and DCE. But LMI protocol type at DTE and DCE must be configured through manual operation or command line in prior art. In this way, it is necessary for the DTE to know the LMI type at DCE in advance, or try to set different LMI protocol types until communication can be implemented between the two sides. But if the DCE supports the above-mentioned three kinds of LMI protocol types simultaneously, then three configuration trials may be needed at the DTE in order to find out a suitable LMI protocol type. In the communication process after the LMI protocol type has been determined, if the current LMI protocol type at DCE changes, all the communications to the connected DTE devices will be interrupted until the LMI protocol types of all connected DTE devices are changed correspondingly. So, system operation and management is inconvenient, normal communication is seriously interfered, and the whole system is unable to work normally due to data lose.

SUMMARY OF THE INVENTION

Accordingly, it is a main object to provide a method for recognizing LMI type automatically by a DTE in order that the DTE can automatically recognize and match current LMI protocol type at the DCE side, thus ensuring normal communication between DTE and DCE, improving reliability and stability of the system, facilitating operation and management of the system.

In order to accomplish the above object, the technical scheme according to the present invention is as follows.

A method for recognizing LMI type automatically by a DTE, comprising: while communicating with a Data Circuit Equipment (DCE) for a first time or when a LMI protocol type at the DCE is changed during a communication process, the DTE generating different status enquiry messages with the frame formats of all LMI protocol types supported by the DTE, and sending said different status enquiry messages to the DCE simultaneously; and after receiving the first status response message from the DCE, the DTE recognizing and recording LMI protocol type of the current response message, and then communicating with the DCE through the messages generated with the frame format of said LMI protocol type.

The method may further comprise: after receiving a status enquiry message sent from the DTE, the DCE generating a corresponding response message with the frame format of LMI protocol type supported by itself, and returning the response message to the DTE.

When the number of overtime errors reaches an overtime error threshold, the LMI protocol type at the DCE is changed.

The above-mentioned LMI protocol type is Q.933 of International Telecommunications Union (ITU), or T1.617 of American National Standards Institute (ANSI), or CISCO LMI standard.

A Data Terminal Equipment (DTE) capable of recognizing Local Management Interface (LMI) type automatically may include:

a first module, adapted to generate different status enquiry messages with the frame formats of all LMI protocol types supported by the DTE, and send said different status enquiry messages to the DCE simultaneously, when communicating with a Data Circuit Equipment (DCE) for a first time or when a LMI protocol type at the DCE is changed during a communication process, and a second module, after receiving the first status response message from the DCE, adapted to recognize and record LMI protocol type of the current response message received from the DCE, and communicate with the DCE through messages generated with the frame format of said LMI protocol type.

The DTE may further include a third module adapted to determine that the LMI protocol type at the DCE is changed during the communication process when the number of overtime errors reaches an overtime error threshold.

It can be seen from the above-mentioned technical scheme that the core idea of the invention lies in: the DTE sends messages with three kinds of protocols simultaneously, no matter the received status response message from the DCE accords with which one of above protocols, LMI types of both sides can be determined through automatic recognizing and matching LMI type at the DCE.

Accordingly, in the method for recognizing LMI type automatically by a DTE according to the present invention, because the DTE sends the messages with three kinds of protocols simultaneously, the DCE simply responds with LMI type supported by itself; and the DTE automatically obtains LMI type supported by the current DCE through recognition and match after receiving the response, and subsequently communicates with DCE with the same LMI configuration. Compared with manual configuration method in prior art, the method according to the present invention has the advantages of time and labor saving, convenience for operation and maintenance as well as intelligent DTE. Meanwhile, no matter what change about LMI type happens at DCE, the DTE can automatically recognize the change and modify its configuration to implement normal communication between two sides, thus ensuring the normal operation of the system and improving reliability and stability of the system. In addition, the method according to the present invention is compatible with both automatic and manual configuration methods without any interfere on implementing of manual or command line configuration in prior art.

DETAILED DESCRIPTION OF THE INVENTION

The present invention will be described in more detail hereinafter with reference to the accompanying drawings.

Because working mechanisms adopted in regulations of the prior three kinds of LMI protocols are enquiring at DTE side and responding at DCE side, the present invention utilizes this general character of the LMI protocols to ensure DTE to recognize LMI type at DCE side automatically. The core idea of this invention is: DTE sends the messages with three kinds of protocols simultaneously, DCE simply responds with LMI type that it supports; and DTE automatically obtains LMI type supported by the current DCE through recognition and match after receiving the response, and subsequently communicates with DCE with the same LMI configuration. After the LMI type supported by the DCE is changed, the above-mentioned processing will be implemented repeatedly.

Figure 1:
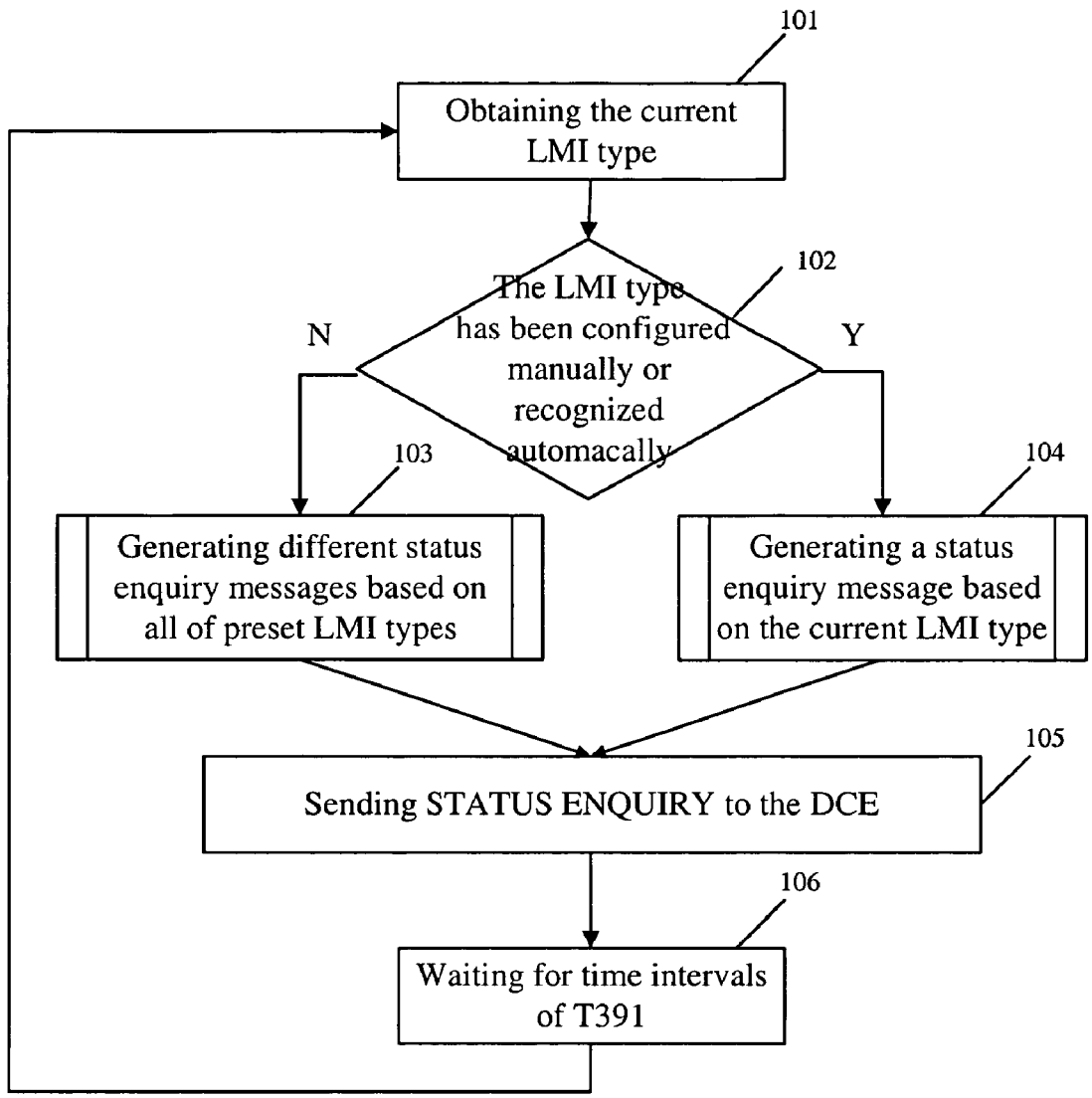
FIG. 1 is a processing flowchart illustrating the operation of sending the STATUS ENQUIRY message to DCE from DTE.
Figure 2:
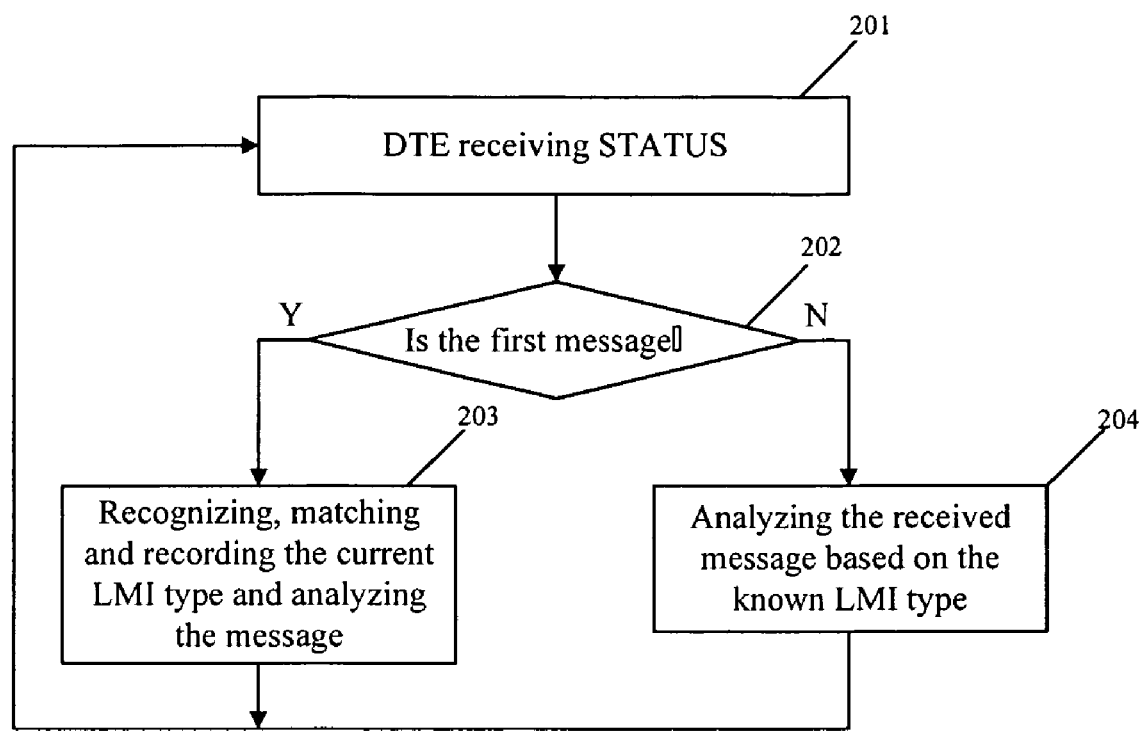
FIG. 2 is a processing flowchart illustrating the operation after DTE receives the response message sent from DCE.

With reference to FIG. 1 and FIG. 2, the processing procedure at least comprises the following steps:

1) Referring to steps 101, 102, 103, 104 and 105, when preparing to send status enquiry message STATUS ENQUIRY to the DCE, the DTE first extracts LMI type of its own, if the LMI type has been manually configured, or obtained via automatic recognition, status enquiry message will be generated based on the current LMI type; else, the DTE generates status enquiry messages STATUS ENQUIRY that match different LMI types respectively according to all the supported LMI types, at most three kinds of LMI protocol types, and sends the messages to the DCE for status enquiry.

2) The DCE recognizes the status enquiry message whose LMI protocol type is the same as that of its own, and replies a correct response message STATUS to the DTE.

3) Referring to steps 201, 202, 203 and 204, after receiving the response message STATUS, the DTE judges whether it is the first response message sent from the DCE, if so, it means the DCE is capable of dealing with the message corresponding to the LMI type correctly, the DTE recognizes, matches and records LMI type included in the response message; if the current DCE response message is not the first one, which means the DTE has completed recognition for LMI type at the DCE, the DTE enquires the DCE with a status enquiry message that is formed by just one kind of LMI type that is the same as that of DCE. At the same time, the DTE also finds out the current link status and PVC status with help of the message parameters.

The above process is repeated circularly, the DTE sends a status enquiry message STATUS ENQUIRY at interval of T391, and waits for the response, as shown at 106 in FIG. 1.

Taking an example, assuming the LMI type currently set at the DCE is Q.933, when the DTE sends three kinds of status enquiry messages generated by different frame formats according to three kinds of LMI protocol types to the DCE, the DCE replies the status enquiry message sent by the DTE in Q.933 format after recognition and match; when the DTE receives a first response, it means the DCE is capable of dealing with the message corresponding to the LMI type correctly, the DTE records LMI type Q.933 of the current response message. Afterwards, the DTE communicates to the DCE with this LMI type.

During communication between DTE and DCE, when LMI type at DCE is changed, because LMI types at opposite sides do not match, the DCE will be unable to recognize the current status enquiry message sent from the DTE, and therefore unable to generate corresponding response message. At this moment, according to protocol rules, overtime error will occur at both sides because of no response received, after the number of errors reaches N392, link status will be changed from usable to unusable. At this time, the DTE will send messages with the three types and automatically recognize new LMI type of the response message generated at DCE once again, after successful recognition, the DTE will communicate with the DCE through the message with the LMI type that is the same as that of the DCE.

In the above-mentioned method, even when DCE changes its configuration about LMI type, or the LMI types at both sides become different due to some other reasons, interrupting communication between the connected sides of DTE and DCE, the present invention can adopt automatic recognition technology to recover the network communication automatically without any manual interference. So, the processing according to the invention has the advantages of convenience, agility and celerity.

The embodiment illustrates the application in frame relay environment; in fact, the method according to the present invention can also be applied in all kinds of circumstances in which different LMI types are adopted.

In a word, the forgoing discussion discloses and describes merely preferred embodiments of the present invention, and cannot be construed to limit the scope of the invention.

The invention claimed is:

1. A method for recognizing Local Management Interface (LMI) type automatically by a Data Terminal Equipment (DTE), comprising:
    during a communication between the DTE and the DCE, when the LMI protocol type at the DCE is changed and the number of overtime errors reaches an overtime error threshold, the DTE generating different status enquiry messages with the frame formats of all LMI protocol types supported by the DTE, and sending said different status enquiry messages to the DCE simultaneously; and
    after receiving a first status response message from the DCE, the DTE recognizing and recording LMI protocol type of the current response message, and then communicating with the DCE through messages generated with the frame format of said LMI protocol type.

2. The method according to claim 1, further comprising: after receiving a status enquiry message sent from the DTE, if the DCE can recognize the status enquiry message, the DCE generating a corresponding response message with the frame format of LMI protocol type supported by itself, and returning the response message to the DTE.

3. The method according to claim 1, wherein said overtime error threshold is determined by the standard protocol.

4. The method according to claim 1, wherein said LMI protocol type is Q.933 of International Telecommunications Union (ITU), or T1.617 of American National Standards Institute (ANSI), or CISCO LMI standard.

* * * * *

UNITED STATES PATENT AND TRADEMARK OFFICE
CERTIFICATE OF CORRECTION

PATENT NO. : 7,580,371 B2
APPLICATION NO. : 10/502906
DATED : August 25, 2009
INVENTOR(S) : Zhimin Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1187 days.

Signed and Sealed this

Fourteenth Day of September, 2010

David J. Kappos
*Director of the United States Patent and Trademark Office*